United States Patent
Hong

(10) Patent No.: US 10,807,246 B2
(45) Date of Patent: Oct. 20, 2020

(54) MOBILE ROBOTIC DEVICE AND METHOD OF CONTROLLING THE SAME MANIPULATOR FOR LOCOMOTION AND MANIPULATION

(71) Applicants: Beijing Jingdong Shangke Information Technology Co., Ltd., Beijing (CN); JD.com American Technologies Corporation, Mountain View, CA (US)

(72) Inventor: Soonhac Hong, San Jose, CA (US)

(73) Assignees: Beijing Jingdong Shangke Information Technology Co., Ltd., Beijing (CN); JD.com American Technologies Corporation, Mountain View, CA (US)

(*) Notice: Subject to any disclaimer, the term of this patent is extended or adjusted under 35 U.S.C. 154(b) by 350 days.

(21) Appl. No.: 15/865,203

(22) Filed: Jan. 8, 2018

(65) Prior Publication Data

US 2019/0210225 A1   Jul. 11, 2019

(51) Int. Cl.
*B25J 9/16* (2006.01)
*B25J 5/00* (2006.01)
*B62D 57/032* (2006.01)
*B62D 57/028* (2006.01)

(52) U.S. Cl.
CPC ............ *B25J 9/1697* (2013.01); *B25J 5/007* (2013.01); *B62D 57/028* (2013.01); *B62D 57/032* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,263,989 B1 * | 7/2001 | Won | ........................ | B25J 5/005 180/8.7 |
| 6,330,494 B1 * | 12/2001 | Yamamoto | ............. | B25J 9/1674 700/261 |
| 6,463,356 B1 * | 10/2002 | Hattori | ................. | B62D 57/032 318/568.12 |
| 6,493,606 B2 * | 12/2002 | Saijo | ........................ | B25J 13/00 700/245 |
| 7,053,579 B2 * | 5/2006 | Moridaira | ............... | B25J 9/1674 180/8.6 |
| 7,313,463 B2 * | 12/2007 | Herr | ........................ | A61F 2/68 700/245 |
| 7,386,364 B2 * | 6/2008 | Mikami | ................. | B62D 57/02 318/443 |

(Continued)

*Primary Examiner* — Bhavesh V Amin
(74) *Attorney, Agent, or Firm* — China Science Patent & Trademark US LLC

(57) ABSTRACT

A mobile robotic device and a method for controlling the mobile robotic device to move are provided. The mobile robotic device includes: a body; a rotatable portion connected to the body and configured to support the body in a rotatable manner; and an operational portion which comprises at least two arms connected to the body and configured to support the body in a walkable manner. In operation, the mobile robotic device is switchable between a manipulation mode in which the rotatable portion supports the body in the rotatable manner and a locomotion mode in which the at least two arms support the body in the walkable manner.

16 Claims, 11 Drawing Sheets

(56) References Cited

U.S. PATENT DOCUMENTS

| | | | | |
|---|---|---|---|---|
| 8,292,007 B2* | 10/2012 | DeFazio | | B62D 61/10 180/9.32 |
| 8,332,068 B2* | 12/2012 | Goswami | | B62D 57/032 700/245 |
| 8,417,382 B2* | 4/2013 | Yoshiike | | B62D 57/032 700/253 |
| 8,463,433 B2* | 6/2013 | Nagasaka | | B25J 13/084 700/245 |
| 8,554,370 B2* | 10/2013 | Goswami | | B62D 57/032 700/253 |
| 8,977,392 B2* | 3/2015 | Nammoto | | B25J 9/1643 700/245 |
| 8,977,485 B2* | 3/2015 | Kessens | | G05D 3/00 701/124 |
| 9,193,403 B2* | 11/2015 | Yun | | B62D 57/032 |
| 9,308,648 B2* | 4/2016 | Perkins | | B62D 57/032 |
| 9,662,791 B1* | 5/2017 | Perkins | | B25J 5/00 |
| 2004/0030447 A1* | 2/2004 | Takahashi | | B25J 9/08 700/245 |
| 2004/0162636 A1* | 8/2004 | Hattori | | B62D 57/032 700/245 |
| 2005/0055131 A1* | 3/2005 | Mikami | | B62D 57/032 700/245 |
| 2005/0107916 A1* | 5/2005 | Nagasaka | | B62D 57/032 700/245 |
| 2005/0113973 A1* | 5/2005 | Endo | | B25J 13/08 700/245 |
| 2007/0013506 A1* | 1/2007 | Takenaka | | B25J 13/085 340/500 |
| 2007/0016329 A1* | 1/2007 | Herr | | A61F 2/70 700/250 |
| 2007/0126387 A1* | 6/2007 | Takenaka | | B25J 13/085 318/568.2 |
| 2007/0135962 A1* | 6/2007 | Kawabe | | G10L 13/00 700/225 |
| 2007/0150106 A1* | 6/2007 | Hashimoto | | G06N 3/004 700/245 |
| 2008/0231221 A1* | 9/2008 | Ogawa | | B25J 13/085 318/568.12 |
| 2009/0105878 A1* | 4/2009 | Nagasaka | | B25J 13/084 700/245 |
| 2012/0200149 A1* | 8/2012 | Rudakevych | | B60B 9/26 305/109 |
| 2013/0231822 A1* | 9/2013 | Gouaillier | | B62D 57/032 701/23 |
| 2013/0268118 A1* | 10/2013 | Grinstead | | B25J 5/005 700/259 |
| 2014/0100768 A1* | 4/2014 | Kessens | | G05D 1/0891 701/124 |
| 2015/0190925 A1* | 7/2015 | Hoffman | | B25J 9/1671 700/257 |
| 2015/0217448 A1* | 8/2015 | Nagarajan | | B62D 57/032 700/245 |
| 2015/0231784 A1* | 8/2015 | Yamauchi | | B25J 9/161 700/253 |

\* cited by examiner

MOBILE ROBOTIC DEVICE AND METHOD OF CONTROLLING THE SAME MANIPULATOR FOR LOCOMOTION AND MANIPULATION

FIELD OF THE INVENTION

The present invention relates generally to robot technology, and more particularly to a mobile robotic device and a method of controlling the mobile robotic device.

BACKGROUND OF THE INVENTION

The background description provided herein is for the purpose of generally presenting the context of the invention. Work of the presently named inventors, to the extent it is described in this background section, as well as aspects of the description that may not otherwise qualify as prior art at the time of filing, are neither expressly nor impliedly admitted as prior art against the present invention.

Robot manipulators have been essential component for operating an object in a factory automation, for example, each of them may pick up or put down the object by a manipulation arm. Most robot manipulators have been used at fixed stations, and cannot move. As flexible manufacturing system has rapidly grown recently and warehouses and retail stores have begun to be automated, it is desirable to have freely-movable robot manipulators. Accordingly, wheels are added to the robot manipulators to form wheel-based mobile manipulators, which move efficiently on an even surface. However, the wheel-based mobile manipulators are not able to cross uneven and unstructured environments and stairs.

Therefore, an unaddressed need exists in the art to address the aforementioned deficiencies and inadequacies.

SUMMARY OF THE INVENTION

In one aspect, the invention is directed to a mobile robotic device. In certain embodiments, the mobile robotic device includes: a body; a rotatable portion connected to the body and configured to support the body in a rotatable manner; and an operational portion which comprises at least two arms connected to the body and configured to support the body in a walkable manner. The mobile robotic device is switchable between a manipulation mode in which the rotatable portion supports the body in the rotatable manner and a locomotion mode in which the at least two arms support the body in the walkable manner. The at least two arms are configured to manipulate an object in the manipulation mode and configured to support the body and move the mobile robotic device in the locomotion mode. In certain embodiments, the at least two arms move the mobile robotic device by walking.

In certain embodiments, in the manipulation mode, the rotatable portion supports the body in a rotatable manner. In certain embodiments the rotatable portion comprises one or more wheels rotatably connected to the body.

In certain embodiments, in the manipulation mode, the rotatable portion supports the body on a surface and the at least two arms are in non-contact with the surface.

In certain embodiments, in the locomotion mode, the at least two arms support the body on a surface and the rotatable portion is in non-contact with the surface. In certain embodiments, in the locomotion mode, the rotatable portion faces toward the surface or faces away from the surface.

In certain embodiments, each of the at least two arms has at least two sections jointed to each other.

In certain embodiments, each of the at least two arms is connected at a same position on the body in the manipulation mode and in the locomotion mode.

In certain embodiments, the body is further provided with a sliding slot or chute to which the at least two arms are slidably jointed, and the at least two arms are located at an upper end on the sliding slot in the manipulation mode and are located at a lower end of the sliding slot in the locomotion mode.

In certain embodiments, the mobile robotic device further includes a controller. The controller is configured to: switch or maintain the mobile robotic device in the manipulation mode when the mobile robotic device is located on an even surface; and switch or maintain the mobile robotic device in the locomotion mode when the mobile robotic device is located on an uneven surface.

In certain embodiments, the mobile robotic device further includes a visual sensor configured to capture an image of a surface on which the mobile robotic device is located. The controller has a processor; and a storage device storing computer executable code. The controller is configured to execute the computer executable code at the processor to perform: controlling the visual sensor to capture image of the surface on which the mobile robotic device is located; determining whether the surface is even or uneven depending on the image captured by the visual sensor; and switching or maintaining the mobile robotic device in the manipulation mode by controlling a posture of the body to cause the rotatable portion to support the body on the surface when the surface is even, or switching or maintaining the mobile robotic device in the locomotion mode by controlling a posture of the body to cause the at least two arms to support the body on the surface when the surface is uneven.

In certain embodiments, the image captured by the visual sensor is in a form of three-dimensional cloud points, and determining whether the surface is even or uneven depending on the image captured by the visual sensor comprises: finding the surface from the image by using plane fitting; computing point distribution on the surface; and deciding the surface is uneven when the point distribution is greater than a predetermined threshold, or deciding the surface is even when the point distribution is less than or equal to the predetermined threshold.

In another aspect, the present invention relates to a method of controlling the mobile robotic device to move. The method includes: determining whether a surface on which the mobile robotic device is located is even or uneven; and switching or maintaining the mobile robotic device in the manipulation mode when the surface is even, or switching or maintaining the mobile robotic device into the locomotion mode when the surface is uneven.

In certain embodiments, determining whether a surface on which the mobile robotic device is located is even or uneven comprises: capturing an image of the surface on which the mobile robotic device is located by a visual sensor; and determining whether the surface on which the mobile robotic device is located is even or uneven depending on the image captured by the visual sensor.

In certain embodiments, the image captured by the visual sensor is in a form of three-dimensional cloud points, and determining whether the surface is even or uneven depending on the image captured by the visual sensor comprises: finding the surface from the image by using plane fitting; computing point distribution on the surface; and deciding the surface is uneven when the point distribution is greater than a predetermined threshold, or deciding the surface is even when the point distribution is less than or equal to the predetermined threshold.

In certain embodiments, switching or maintaining the mobile robotic device in the manipulation mode comprises controlling a posture of the body to cause the rotatable portion to support the body on the surface.

In certain embodiments, switching or maintaining the mobile robotic device in the locomotion mode comprises controlling a posture of the body to cause the at least two arms to support the body on the surface.

In a further aspect, the present invention relates to a mobile robotic device. The mobile robotic device includes a body and at least two arms connected to the body. The mobile robotic device is switchable between a manipulation mode in which the at least two arms are configured to manipulate an object and a locomotion mode in which the at least two arms support the body and move the mobile robotic device. In certain embodiments, the at least two arms move the mobile robotic device in a walking manner. In other words, the at least two arms function as legs of the mobile robotic device to walk.

In certain embodiments, the body is supported fixedly on a surface when the mobile robotic device is in the manipulation mode.

In certain embodiments, the mobile robotic device maintains or switches to the manipulation mode when a surface the mobile robotic device is located on is even, and the mobile robotic device maintains or switches to the locomotion mode when the surface is uneven.

In certain embodiments, each of the at least two arms has at least two sections articulated to each other.

These and other aspects of the present invention will become apparent from following description of the preferred embodiment taken in conjunction with the following drawings and their captions, although variations and modifications therein may be affected without departing from the spirit and scope of the novel concepts of the invention.

BRIEF DESCRIPTION OF THE DRAWINGS

The present invention will become more fully understood from the detailed description and the accompanying drawings. These accompanying drawings illustrate one or more embodiments of the present invention and, together with the written description, serve to explain the principles of the present invention. Wherever possible, the same reference numbers are used throughout the drawings to refer to the same or like elements of an embodiment, and wherein.

DETAILED DESCRIPTION OF THE INVENTION

Figure 1A:
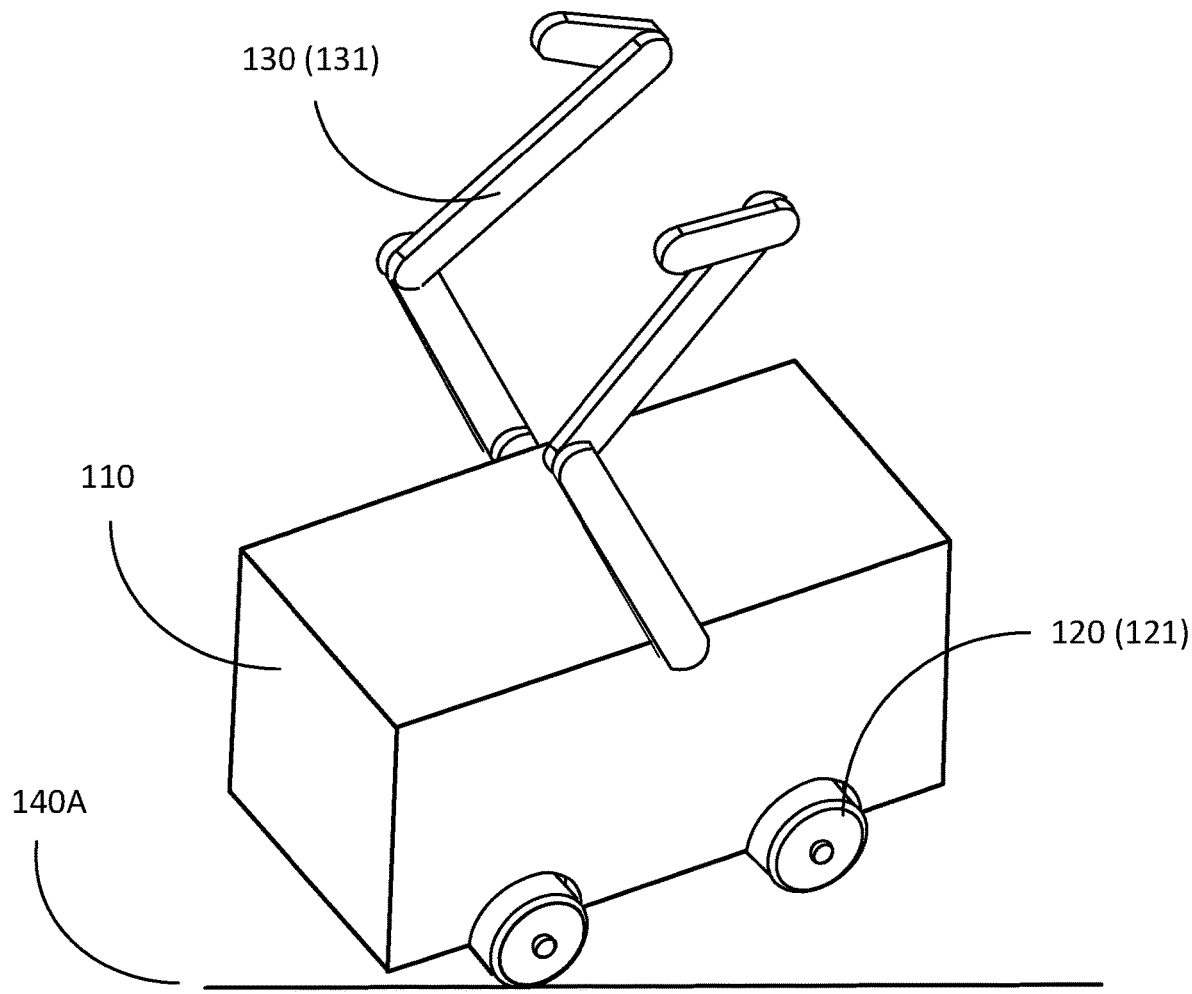
FIG. 1A and FIG. 1B schematically depict a mobile robotic device according to certain embodiments of the present invention.

The present invention is more particularly described in the following examples that are intended as illustrative only since numerous modifications and variations therein will be apparent to those skilled in the art. Various embodiments of the invention are now described in detail. Referring to the drawings, like numbers, if any, indicate like components throughout the views. Additionally, some terms used in this specification are more specifically defined below.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

Unless otherwise defined, all technical and scientific terms used herein have the same meaning as commonly understood by one of ordinary skill in the art to which this invention pertains. In the case of conflict, the present document, including definitions will control.

As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Further, relative terms, such as "lower" or "bottom", "upper" or "top", and "left" and "right", may be used herein to describe one element's relationship to another element as illustrated in the Figures. It will be understood that relative terms are intended to encompass different orientations of the device in addition to the orientation depicted in the figures.

As used herein, "plurality" means two or more. As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present invention.

As used herein, the term "module" may refer to, be part of, or include an Application Specific Integrated Circuit (ASIC); an electronic circuit; a combinational logic circuit;

a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present invention relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present invention will now be described more fully hereinafter with reference to the accompanying drawings, in which embodiments of the present invention are shown. This invention may, however, be embodied in many different forms and should not be construed as limited to the embodiments set forth herein; rather, these embodiments are provided so that this invention will be thorough and complete, and will fully convey the scope of the present invention to those skilled in the art.

Figure 1B:
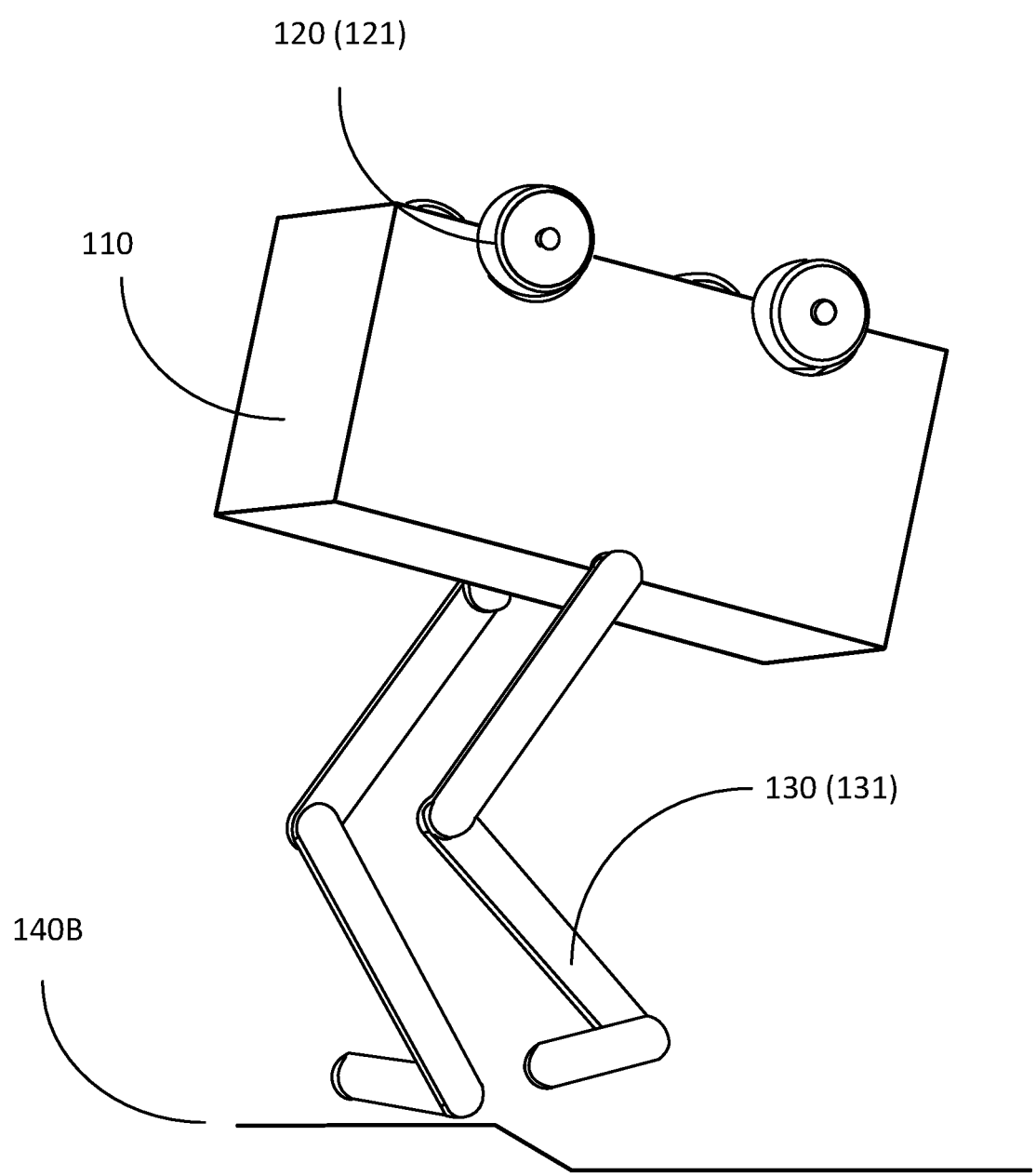

FIGS. 1A and 1B schematically depicts a mobile robotic device 100 according to certain embodiments of the present invention, where the mobile robotic device 100 is switchable between a manipulation mode as shown in FIG. 1A and a locomotion mode as shown in FIG. 1B. As shown in FIG. 1A, the mobile robotic device 100 stands on an even ground surface 140A. The mobile robotic device 100 includes a body 110, and a rotatable portion 120 and an operational portion 130 respectively connected to the body 110. The rotatable portion 120, for example, may be one or more wheels 121 rotatably connected to the body 110. The one or more wheels 121 are configured to support the body 110 in a rotatable manner, that is, the wheels 121 may stand still on the surface 140A, or rotate to move the mobile robotic device 110 on the surface 140A. The operational portion 130, for example, may include at least two arms 131. The arms 131 have two functions, i.e., manipulating an object, and supporting the mobile robotic device 100 and walking to move the mobile robotic device 100. As shown in FIG. 1A, under the manipulation mode, the wheels 121 stand on the surface 140A, and the arms 131 don't contact the surface 140A, but are free to manipulate any target objects. The manipulation of the arms 131 may include, but not limited to, picking up the object, moving the object, sticking a label on the object, positioning the object in a predetermined position and orientation, etc.

When the ground surface is an uneven surface, the mobile robotic device 100 is switchable form the manipulation mode to the locomotion mode. When the mobile robotic device 100 is under the locomotion mode, as shown in FIG. 1B, the two arms 131 actually function as legs, and the mobile device 100 stands on an uneven surface 140B using the two legs 131. The uneven surface 140B includes any irregular surfaces or stairs or unstructured environment that are not suitable for the wheels 121 to move thereon smoothly. The two legs 131 may stand still on the surface 140B, or walk step by step to move the mobile device 100 on the uneven surface 140B. In certain embodiments, the two arms or legs 131 may also be able to move the mobile device 100 by other manner instead of walking. Under the locomotion mode, the wheels 121 don't touch the ground surface 140B.

The mobile robotic device 110 is switchable between the manipulation mode and the locomotion mode in any suitable manner. Taking FIGS. 1A and 1B as an example, when the mobile robotic device 110 moves or stands on the even surface 140A, the mobile robotic device 110 maintains at the manipulation mode; and when the mobile robotic device 110 moves to the uneven surface 140B, the mobile robotic device 110 is switched from the manipulation mode to the locomotion mode. The switching process may be in the following manner: the two arms (legs) 131 move or rotate downward to touch the uneven surface 140B, push the surface 140B, and extends, such that the body 110 and the wheels 121 move upward, and the wheels 121 don't touch the ground surface anymore. After moving up for a predetermined height, the mobile robotic device 100 may rotate the body 110 around the connection between the body 110 and the legs 131, and as shown in FIG. 1B, the bottom side of the body 110 now is located at the top and faces upward, and the wheels 121 attached to the bottom side of the body 110 consequently face upward too and are located at the top. In other words, the side of the body 110 that having the wheels 121 faces the ground surface 140A when in the manipulation mode, and faces away from the ground surface 140B when in the locomotion mode. By the rotation of the body 110, there are more space available between the body 110 and the ground surface 140B, such large clearance is advantages for certain operation of the mobile robotic device 100. For example, when the mobile robotic device 100 steps on stairs, the body 110 is less likely to bump to the stairs if the body 110 has rotated. In certain embodiments, the body 110 may not need to be rotated at all, and in the locomotion mode, both the wheels 121 and the arms 131 are located at the bottom or lower part of the body 110. By switching between the manipulation mode and the locomotion mode, the mobile robotic device 100 is able to move in different types of surfaces or stairs, and applicability of the mobile robotic device 110 to a variety of environment may be improved. In other words, under locomotion mode, the mobile robotic device 100 is configured for locomotion using the operational portion 130 (or the arms 131) as walking legs; and under manipulation mode, the mobile robotic device 100 is configured for manipulation objects using the operational portion 130 (or the arms 131) as manipulation arms.

In certain embodiments, the number of wheels 121 can vary, which may be two, three, four or more than four. In certain embodiments, the number of arms or legs 131 may be more than two, such as four or six or any other suitable number.

In certain embodiments, as shown in FIG. 1A, in the manipulation mode, the rotatable portion 120 supports the body 110 on the surface 140A and the at least two arms 131 are in non-contact with the surface 140A. In this way, the body 110 can be supported completely by the rotatable portion 120. However, embodiments of the present invention are not limited to this, for example, the at least two arms 131 may alternatively touch the surface 140A for certain manipulation of the object in the manipulation mode.

In certain embodiments, in order to help the mobile robotic device 100 to walk better, each of the at least two arms 131 may include two or more sections jointed to each other.

In the embodiments shown in FIGS. 1A and 1B, under either the manipulation mode or the locomotion mode, the arms or legs 131 are connected to the same place of the body portion 110. In other embodiments, the arms or legs 131 may be connected to different places of the body portion 110 under the operational and the locomotion modes.

Figure 2A:
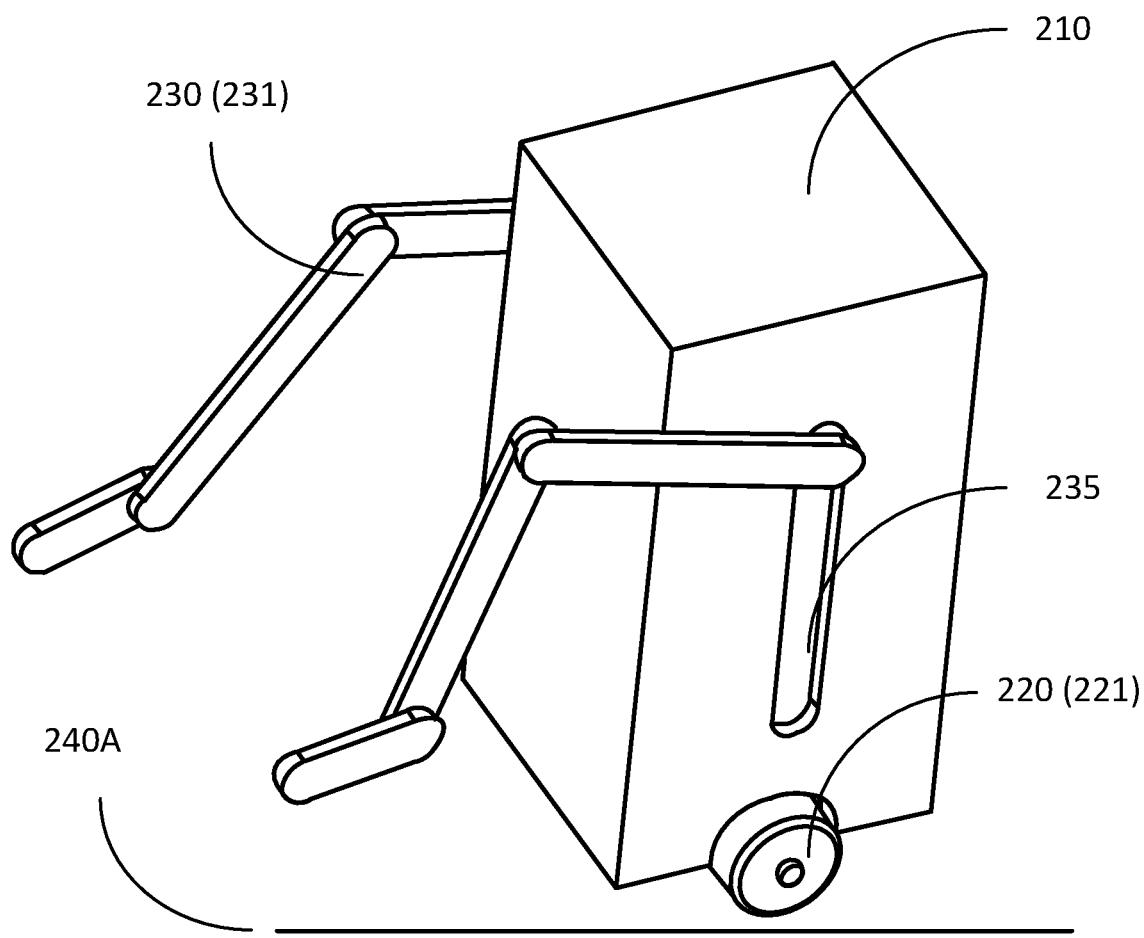
FIG. 2A and FIG. 2B schematically depict a mobile robotic device according to certain embodiments of the present invention.
Figure 2B:
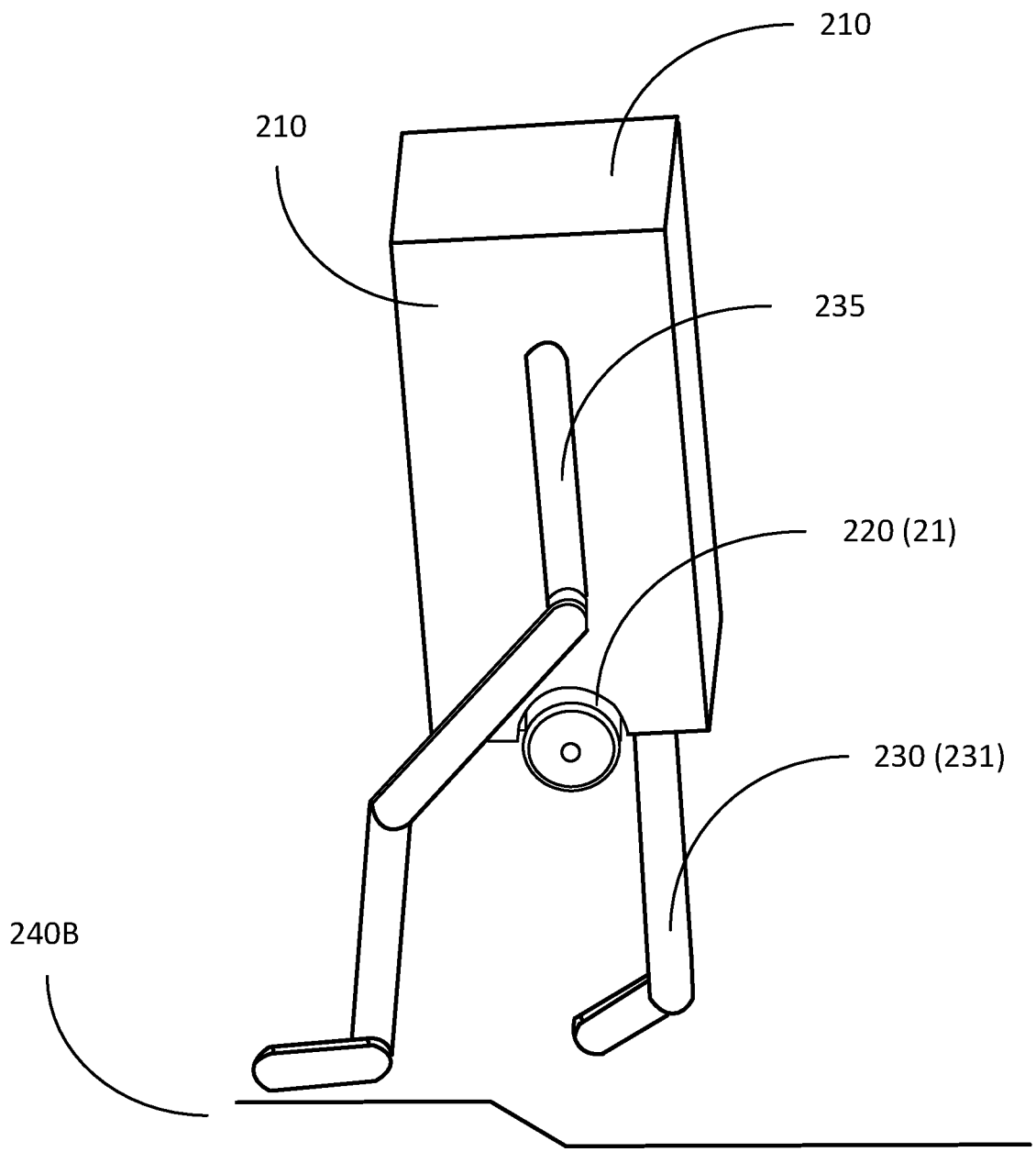

FIG. 2A and FIG. 2B schematically show a mobile robotic device 200 according to certain embodiments of the present invention, where the mobile robotic device 200 includes a body 210, and a rotatable portion 220 (wheels 221) and an operational portion 230 (the arms or legs 231) connected to the body 210, and a sliding slot 235 formed on the body 210 and corresponding to each arm or leg 231. Each arm or leg 231 is movable along corresponding one of the sliding slots 235. When in manipulation mode, as shown in FIG. 2A, the arms 231 are respectively connected at the upper ends of the sliding slots 235, and the arms 231 are able to manipulate the object. When in locomotion mode, as shown in FIG. 2B, the arms or legs 231 are respectively connected at the lower ends of the sliding slots 235, and the legs 231 are able to support the mobile robotic device 200 and to move the mobile robotic device 200 by walking or other suitable manner. By this type of design, the body 210 may be prevented from being inverted when the mobile robotic device 200 is switched between the manipulation mode and the locomotion mode. Further, the manipulation function and the walking function of the arms or legs 231 may be easily differentiated and accomplished efficiently by place the arms or legs 231 at the different positions. Furthermore, the sliding down of the arms or legs 231 in the sliding slot 235 during the locomotion mode provides more space between the body 210 and the ground surface 240B, such that the mobile robotic device 200 can walk efficiently without bumping to any obstacles. Moreover, the arms or legs 231 may be connected to different structure components or driving mechanism at the upper end and the lower end of the sliding slots 235 to respectively accomplish its manipulation function and walking function. In certain embodiments, the sliding slot 235 may extend along a vertical direction. Either in the manipulation mode or in the locomotion mode, the bottom surface of the body 210 having the wheels 221 faces the ground surface 240A or 240B, but the wheels 221 don't touch the uneven surface 240B when the mobile robotic device 200 is in the locomotion mode.

In the above embodiments shown in FIGS. 1A, 1B, 2A and 2B, the mobile robotic device 100, 200 include both the rotatable portion 120/220 and the operational portion 130/230. However, embodiments of the present invention are not limited to these structures, for example, the rotatable portion 120/220 are optional in certain embodiments of the present invention.

Figure 3A:
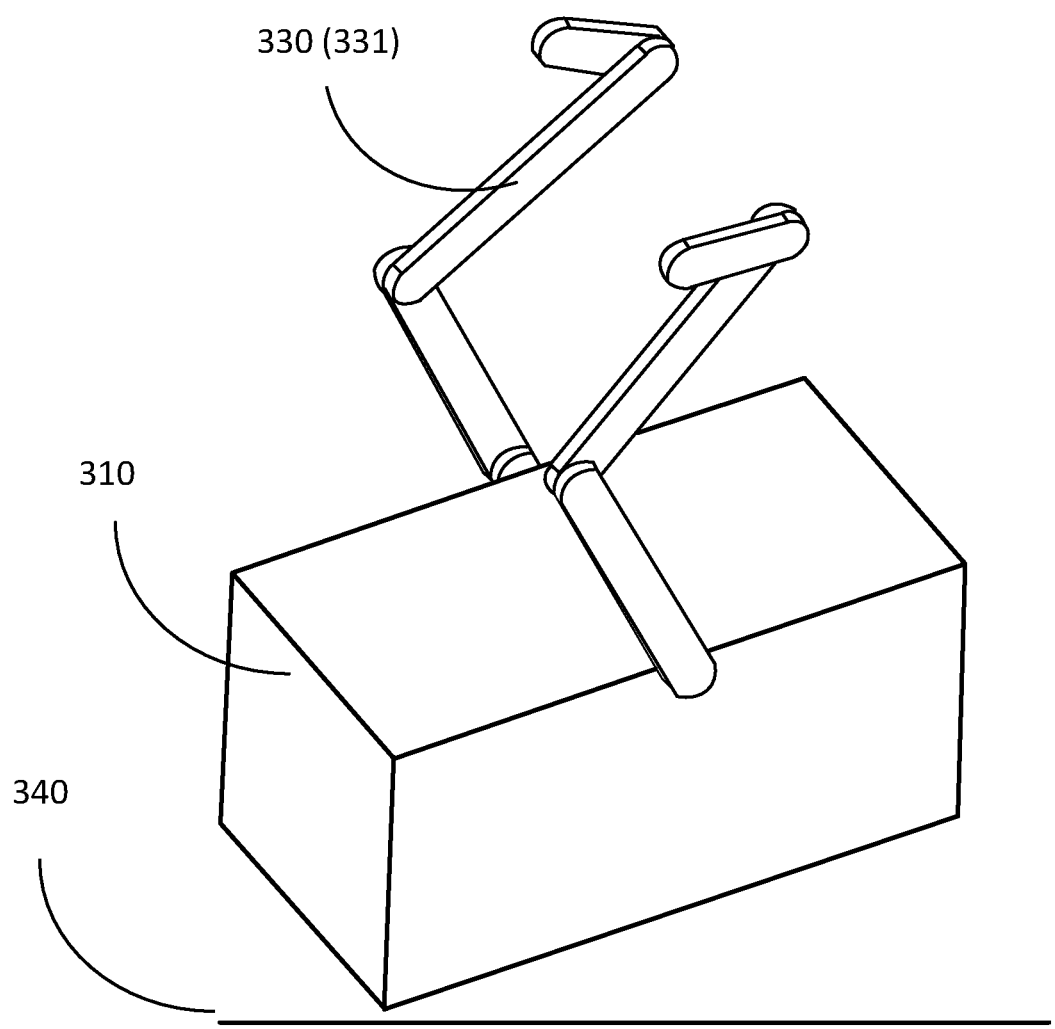
FIG. 3A and FIG. 3B schematically depict a mobile robotic device according to certain embodiments of the present invention.
Figure 3B:
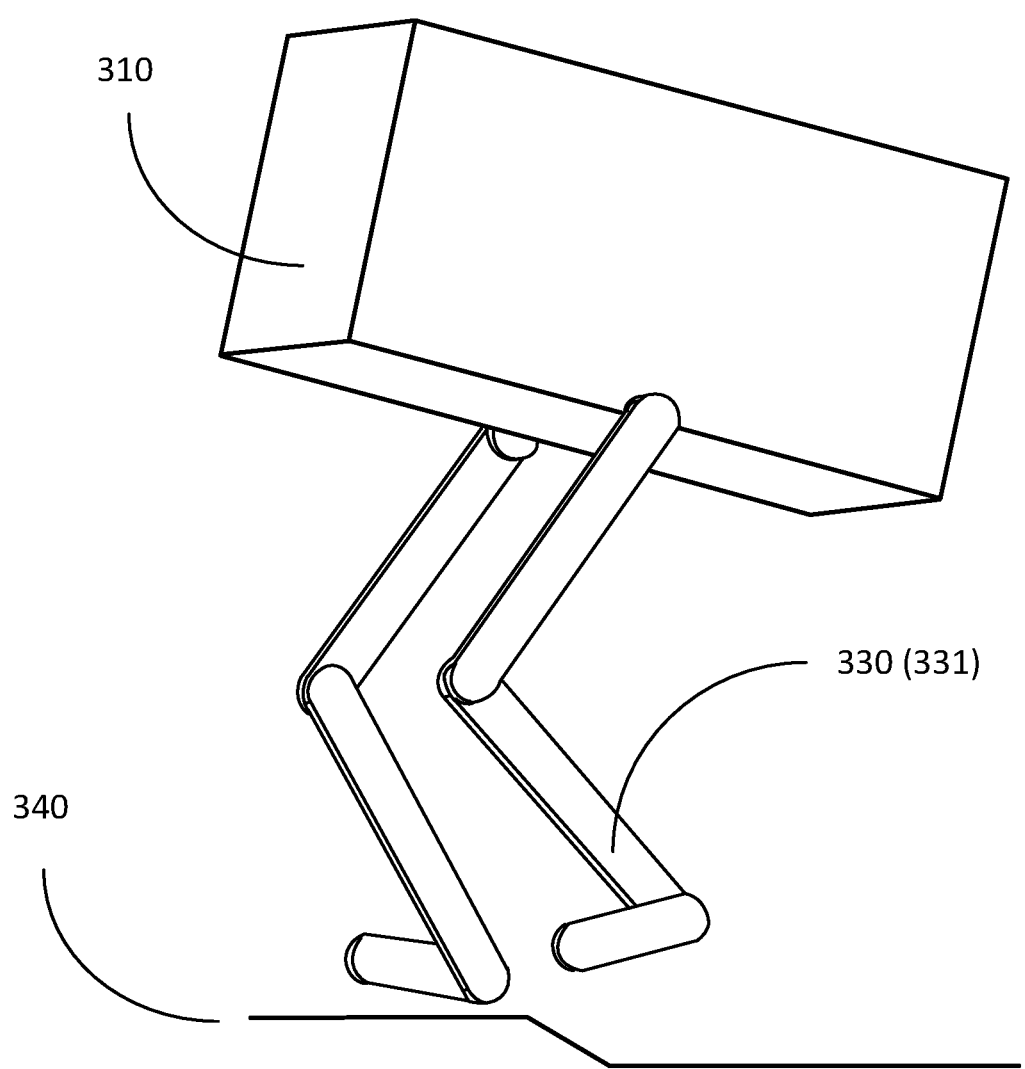

FIGS. 3A and 3B schematically show a mobile robotic device 300 according to certain embodiments of the present invention. The mobile robotic device 300 includes a body 310 and an operational portion 330 connected to the body 310. The operational portion 330 may include at least two arms 331. The mobile robotic device 300 is switchable between a manipulation mode in which the at least two arms 331 are configured to manipulate an object and a locomotion mode in which the at least two arms 331 support the body 310 in the walkable manner. As shown in FIG. 3A, the body 310 is supported on a ground surface, such as an even surface 340 when the mobile robotic device 300 is in the manipulation mode, and the two arms 331 are configured to manipulate any target objects. Since the mobile robotic device 300 does not include a rotatable portion (for example, wheels), the mobile robotic device 300 may stand directly on the surface 340 through its bottom surface. As shown in FIG. 3B, when in locomotion mode, the mobile robotic device 300 walks using the at least two arms or legs 331 on an even or uneven surface or stairs 340. The structure of the mobile robotic device 300 is similar to that of the mobile robotic device 100, except that the mobile robotic device 300 doesn't include a rotatable portion or wheels.

Figure 4A:
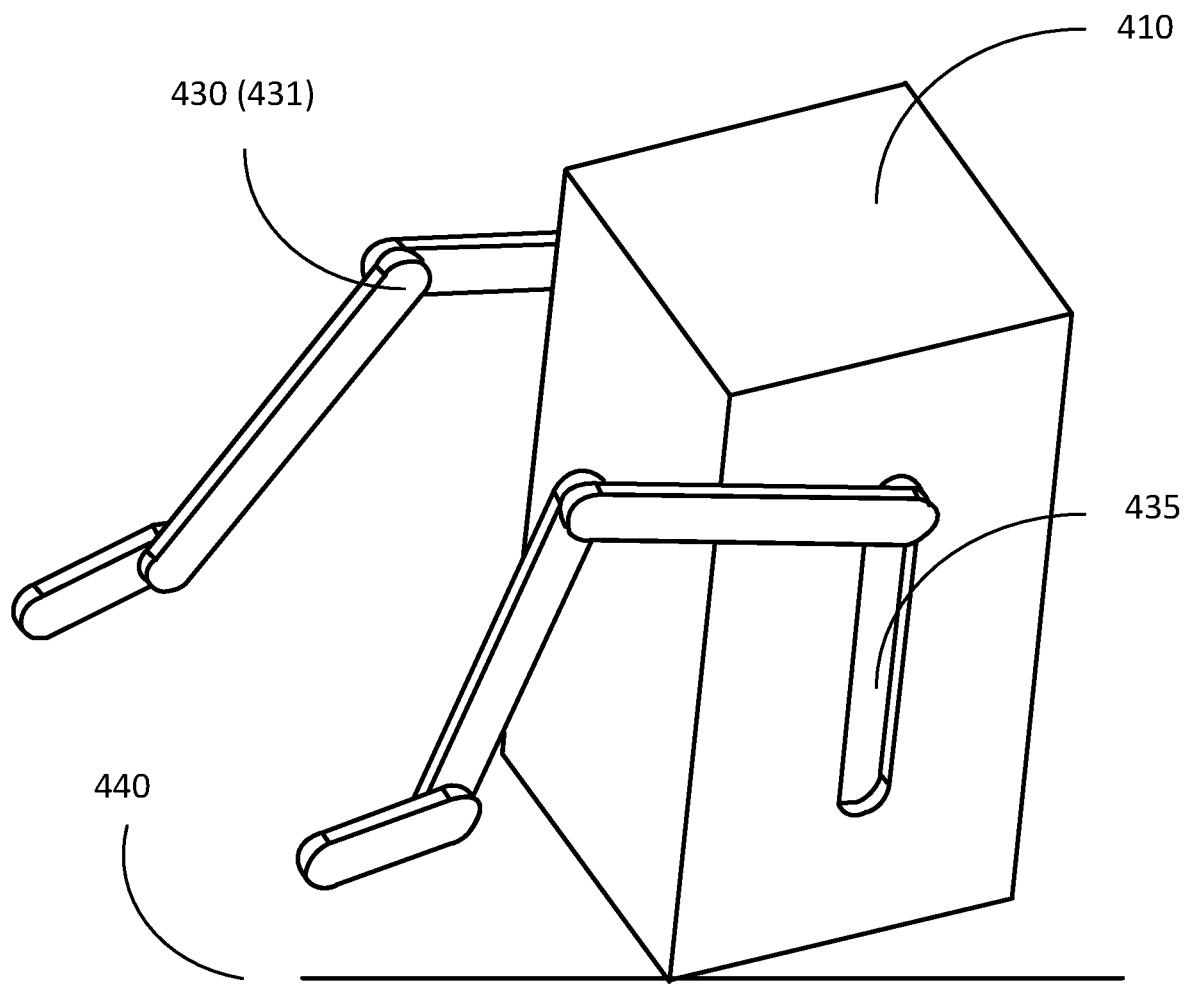
FIG. 4A and FIG. 4B schematically depict a mobile robotic device according to certain embodiments of the present invention.
Figure 4B:
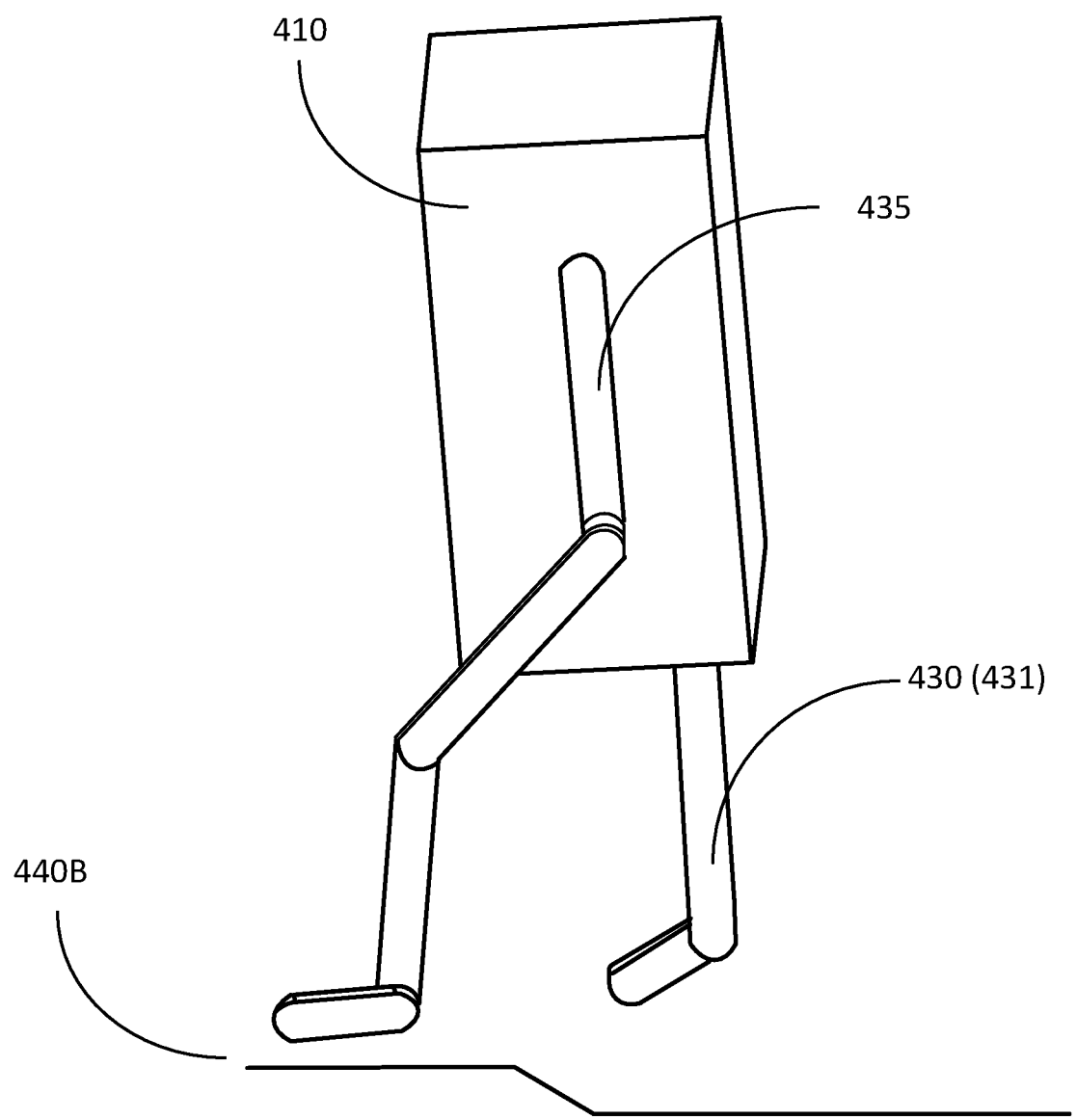

FIGS. 4A and 4B schematically show a mobile robotic device 400 according to certain embodiments of the present invention. The mobile robotic device 400 includes a body 410, an operational portion 430 connected to the body 410, and sliding slots 435 formed on the body 410. The operational portion 430 may include at least two arms 431, and each of the arms 431 is configured to slide within corresponding one of the sliding slots 435. The mobile robotic device 400 is switchable between a manipulation mode in which the at least two arms 431 are configured to manipulate an object and a locomotion mode in which the at least two arms 431 support the body 410 in the walkable manner. As shown in FIG. 4A, when the mobile robotic device 400 is in the manipulation mode, the body 410 is supported on a ground surface 440, such as an even surface (or an uneven surface as long as the body 410 can be placed thereon stably), and the two arms 431 are positioned at the upper end or lower portion of the sliding slots 435 and configured to manipulate any target objects. Since the mobile robotic device 400 does not include a rotatable portion (for example, wheels), the mobile robotic device 400 may stand directly on the surface 440 through its bottom surface. As shown in FIG. 4B, when in locomotion mode, the at least two arms or legs 431 are positioned at the lower end of the sliding slots 435, and the mobile robotic device 400 walks using the at least two arms or legs 431 on an even or uneven surface or stairs 440. The structure of the mobile robotic device 400 is similar to that of the mobile robotic device 200, except that the mobile robotic device 400 doesn't include a rotatable portion or wheels.

Figure 5:
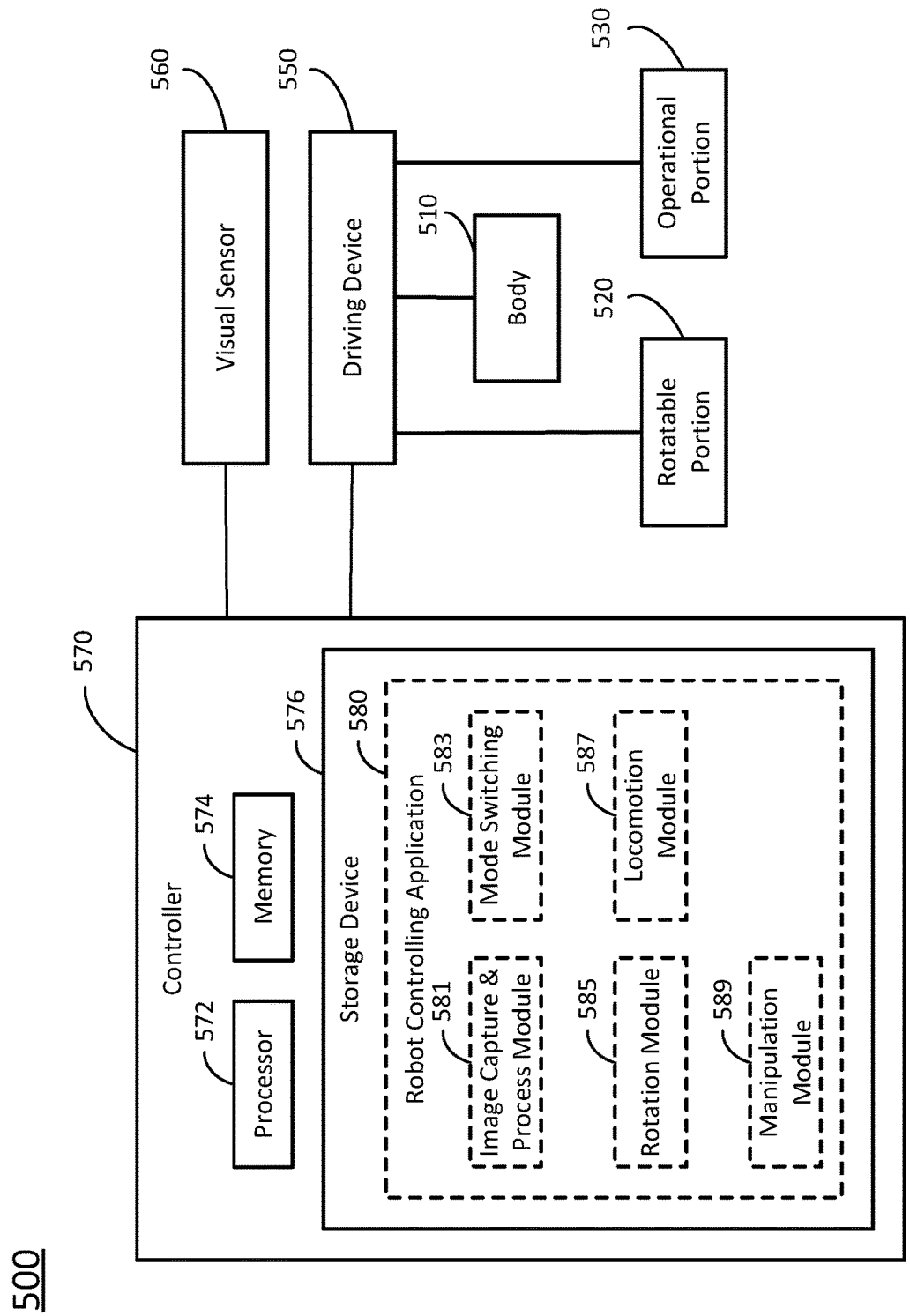
FIG. 5 schematically depicts a mobile robotic device according to certain embodiments of the present invention.

Each of the above described mobile robotic devices 100, 200, 300, 400 may further include a controller to control the operation of the mobile robotic devices. FIG. 5 schematically shows a mobile robotic device 500 according to certain embodiments of the present invention. As shown in FIG. 5, the mobile robotic device 500 includes a body 510, a rotatable portion 520 and an operational portion 530 connected to the body 510, a driving device 550 configured to drive the rotatable portion 520 and the operational portion 530, a visual sensor 560 configured to capture images of environment, and a controller 570 for controlling the operations of the driving device 550 and the visual sensor 560. The driving device 550 may be one or more motors, and the visual sensor 560 may be a 2D camera or a 3D camera or a depth camera. The controller 570 is a computing device, which may be a general-purpose computer, a specialized computer, a server, or any other types computing device. The controller 570 may work independently, or work with other devices communicated through wireless or other types of connections. Therefore, one or more of the components of the controller 570 may be placed inside the robot 500 or remotely.

The controller 570 may include, without being limited to, a processor 572, a memory 574, and a storage device 576. In certain embodiments, the controller 570 may include other hardware components and software components (not shown) to perform its corresponding tasks. Examples of these hardware and software components may include, but not limited to, other required memory, interfaces, buses, Input/Output (I/O) modules and peripheral devices. The processor 572 is configured to control operation of the controller 570 and may be one or more central processing units (CPU) or other type of processors. The memory 574 may be one or more volatile memory, such as the random-access memory (RAM), for storing the data and information during the operation of the controller 570. In certain embodiments, the memory 574 is in communication with the processor 572 through a system bus (not shown). The storage device 576 is a data storage media for storing an operating system (OS) (not shown) and other applications of the controller 570. Examples of the storage device 576 may include non-volatile memory such as flash memory, memory cards, USB drives, hard drives, or any other types of data storage devices.

As shown in FIG. 5, the storage device 576 stores robot controlling application 580 of the controller 570. The robot controlling application 580 includes computer executable codes for performing the operation of the controller 570. As shown in FIG. 5, the robot controlling application 580 includes, among other things, an image capture and process module 581, a mode switching module 583, a rotation module 585, a locomotion module 587, and a manipulation module 589. In certain embodiments, each of the modules of the robot controlling application 580 may further include one or more sub-modules. Alternatively, in certain embodiments, some or all of the modules of the robot controlling application 580 may collectively form a single module.

The image capture and process module 581 is configured to control the visual sensor 560 to capture one or a series of images of the environment, and process the images to determine whether the mobile robotic device 500 is positioned in an environment that has an even surface or an uneven surface. When the environment surface is determined as the even surface or the uneven surface, the image capture and process module 581 instruct the mode switching module 583 to maintain it's current mode or switch to a different mode. In certain embodiments, the image capture and process module 581 may also establish a 3D map to aid the moving control of the mobile robotic device 500 by the rotation module 585 or the locomotion module 587.

The mode switching module 583, in response to receiving the instruction from the image capture and process module 581 about whether the environment has the even surface or the uneven surface, maintains the current mode or switches to a different mode. The mobile robotic device 500 may be operated under a manipulation mode and a locomotion mode. When the mobile robotic device 500 is operated under the manipulation mode, the rotatable portion 520, such as wheels, support and/or move the mobile robotic device 500; and at the same time or sequentially, the operational portion 530, such as two arms, manipulates one or more objects. When the mobile robotic device 500 is operated under the locomotion mode, the two arms of the operational portion 530 may function as two legs, to support and move the mobile robotic device 500 in a walkable manner. At this time, the operational portion 530 may only function as moving means, and may not be able to manipulate the objects. In certain embodiments, the two legs of the operational portion 530 may have both the moving function and the manipulation function. For example, when one leg stands on the ground for supporting and the other leg steps forward to move, the other leg may at the same time kick or push the object. When the mobile robotic device 500 is under the manipulation mode, and the image capture and process module 581 sends an instruction to the mode switching module 583 that the environment has an even surface, the mode switching module 583 may keep silence and maintain the mobile robotic device 500 under the current manipulation mode; when the image capture and process module 581 sends an instruction to the mode switching module 583 that the environment has an uneven surface, the mode switching module 583 would switch the mobile robotic device 500 to the locomotion mode, that is, activate the locomotion module 587. When the mobile robotic device 500 is under the locomotion mode, and the image capture and process module 581 sends an instruction to the mode switching module 583 that the environment has an even surface, the mode switching module 583 would switch the mobile robotic device 500 to the manipulation mode, that is, activate the rotation module 585 and optionally activate the manipulation module 589; when the image capture and process module 581 sends an instruction to the mode switching module 583 that the environment has an uneven surface, the mode switching module 583 may keep silence and maintain the mobile robotic device 500 under the locomotion mode.

The rotation module 585 is configured to control the driving device 550, such that the driving device 550 keeps the rotatable portion 520 to stand still or rotates the rotatable portion 520 to move the mobile robotic device 500. In certain embodiments, the rotation module 585 is activated by the mode switching module 583 when the mode switching module 583 determines to switch the mobile robotic device 500 from the locomotion mode to the manipulation mode. In certain embodiments, the rotation module 585 is activated as a default when the mobile robotic device 500 is powered on.

The locomotion module 587 is configured to control the driving device 550, such that the driving device 550 keeps the operational portion 530 to stand still or makes the operational portion 530 to move the mobile robotic device 500 such as by walk. In certain embodiments, the locomotion module 587 is activated by the mode switching module 583 when the mode switching module 583 determines to switch the mobile robotic device 500 from the manipulation mode to the locomotion mode. In certain embodiments, the manipulation mode is activated as a default when the mobile robotic device 500 is powered on. In certain embodiments, the locomotion module 587 is not limited to move the movable robotic device 500 by walking, and any other suitable manner by the locomotion module 587 to move the mobile robotic device 500 is within the scope of the present invention.

The operation module 589 is configured to control the driving device 550, such that the driving device 550 drives the operational portion 530 to manipulate an object, such as a work piece, a product or a package.

In certain embodiments, the robot controlling application 580 may further includes a database or a record, where the record includes the surface feature such as even or uneven, and the current mode and/or previous modes of the mobile robotic device. In certain embodiments, the image capture and process module 581 stores the determined environment information, such as the even or uneven surface, in the record; and the mode switching module 583 may continuously check the record to update the current surface feature. Further, when the mode switching module 583 changes the mode of the mobile robotic device 500, the current mode may also be stored in the record.

Figure 6:
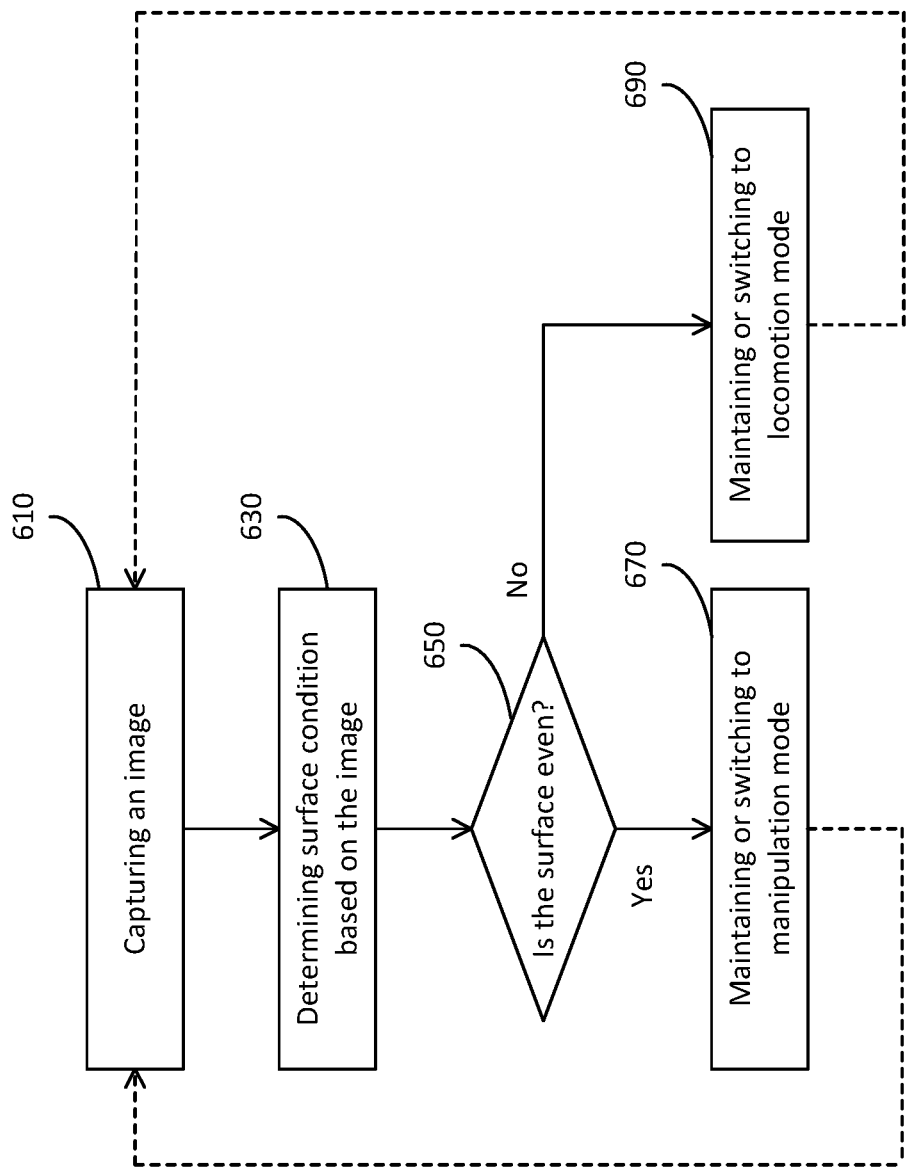
FIG. 6 schematically shows a flow chart of a method of controlling a mobile robotic device according to certain embodiments of the present invention.

FIG. 6 schematically depicts a flowchart showing a method of controlling moving mode of a mobile robotic device according to certain embodiments of the present invention. In certain embodiments, the method as shown in FIG. 6 may be implemented on a system as shown in FIG. 5. It should be particularly noted that, unless otherwise stated in the present invention, the steps of the method may be arranged in a different sequential order, and are thus not limited to the sequential order as shown in FIG. 6.

As shown in FIG. 6, at procedure 610, the visual sensor or the camera 560 of the mobile robotic device 500 captures one or more images of the environment. The camera 560 may be a 2D camera, a 3D camera, a depth camera, or a combination thereof. The captured images are sent to the image capture and process module 581, or alternatively, the image capture and process module 581 retrieves the images from the camera 560.

Upon receiving the images from the camera 560, at procedure 630, the image capture and process module 581 processes the images, and determines surface condition based on the images. In certain embodiments, the image capture and process module 581 may simply define the surface, such as the ground surface that the mobile robotic device 500 standing on, as an even surface or uneven surface. In other embodiments, the image capture and process module 581 may further specify the uneven surface, for example as stairs.

At procedure 650, the image capture and process module 581 then sends the determination result, i.e., whether the surface is an even surface or an uneven surface, to the mode switching module 583.

At procedure 670, when the determination result is that the surface is an even surface, the mode switching module 583 maintains or switches the mobile robotic device 500 to the manipulation mode, depending on the current mode of the mobile robotic device 500. In other words, if the current mode is the manipulation mode, then the mobile robotic device 500 maintains its manipulation mode, where the rotatable portion 520 stands still or rotates to move, and the operational portion 530 manipulates the object. If the current mode is the locomotion mode, then the mobile robotic device 500 switches to the manipulation mode.

At procedure 690, when the determination result is that the surface is an uneven surface, the mode switching module 583 maintains or switches the mobile robotic device 500 to the locomotion mode, depending on the current mode of the mobile robotic device 500. In other words, if the current mode is the manipulation mode, then the mobile robotic device 500 switches to the locomotion mode, where the operational portion 530 stands still or walks by steps to move. If the current mode is the locomotion mode, then the mobile robotic device 500 maintains the locomotion mode, standing still or walking using the operational portion 530.

In certain embodiments, the maintain or switch of the mode may be determined not only by the determination of the ground surface type, but also by other parameters, such as the distance need to be traveled by the mobile robotic device 500, the location of the object, and the next action of the mobile robotic device 500, etc. For example, if the mobile robotic device 500 operates under the locomotion mode and climbed up stairs, and then moves a short distance on an even surface, the mobile robotic device 500 may choose to walk using the arms or legs to travel the short distance on the even surface instead of switching and using the rotatable portion 520 to travel the short distance on the even surface.

In certain embodiments, after the procedure 670 or the procedure 690, the procedure goes back to the procedure 610 to capturing more images. In other embodiments, the visual sensor 560 may continuously capture images, and doesn't need the feedback from the mode switching module 583.

Figure 7:
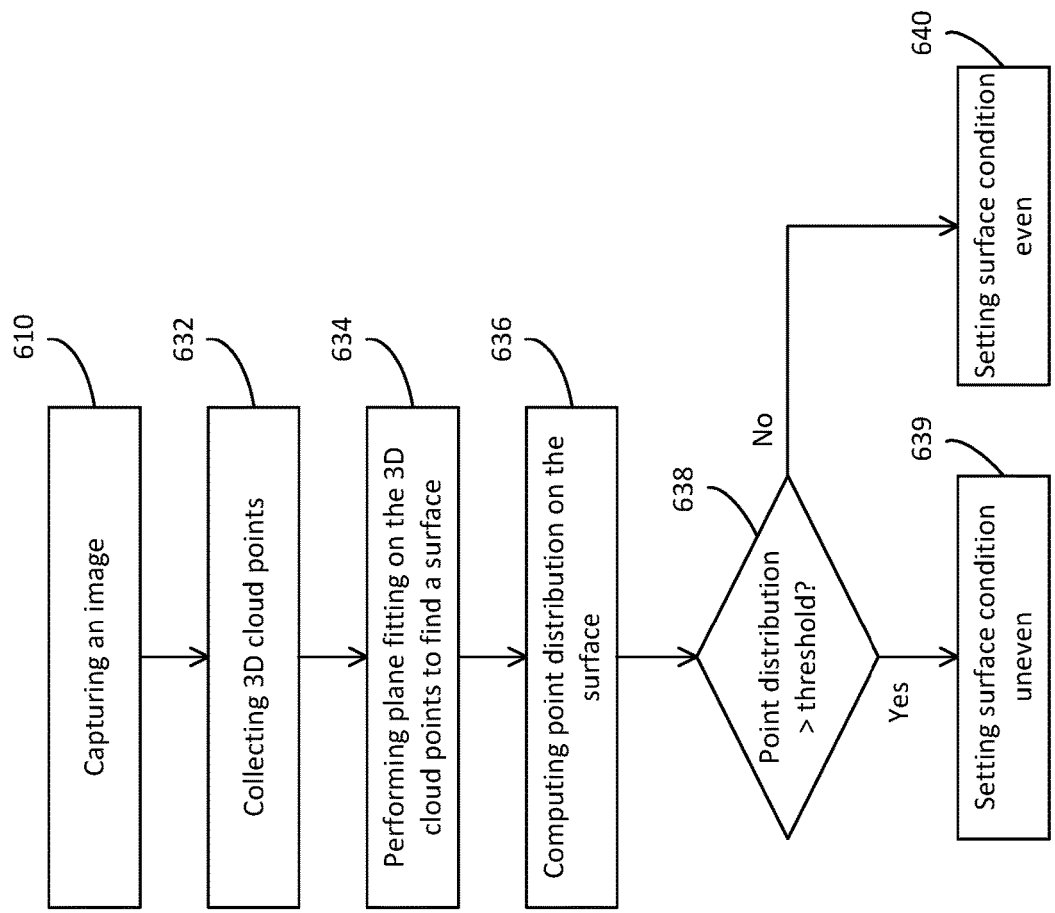
FIG. 7 schematically shows a flow chart for determining conditions of surface on which the mobile robotic device is located according to certain embodiments of the present invention.

FIG. 7 schematically depicts a flowchart showing a method of determining a surface condition according to certain embodiments of the present invention. In certain embodiments, the method as shown in FIG. 7 correspond to the procedure 630 as shown in FIG. 6. It should be particularly noted that, unless otherwise stated in the present invention, the steps of the method may be arranged in a different sequential order, and are thus not limited to the sequential order as shown in FIG. 7.

At procedure 610, as described above, the camera 560 captures images, and sends the images to the image capture and process module 581. The images include two or more 2D images, or at least one 3D image. In response to receiving the images, the image capture and process module 581 performs the following steps.

At procedure 632, the image capture and process module 581 collects 3D cloud points to represent the environmental surfaces, such as ground surfaces and optionally surfaces of items on the ground that are viewable. Since 3D information is necessary for the 3D cloud points, two or more 2D images or at least one 3D image is required.

After obtaining the 3D cloud points, at procedure 634, the image capture and process module 581 performs plane fitting on the 3D cloud points to find a surface. In certain embodiments, the plane fitting may be achieved by known plane fitting algorithms, e.g., the surface may be defined as a plane which may be found if the sum of distances of all of points to the plane is minimum. However, embodiments of the present invention are not limited to this, instead, other plane fitting algorithms in the art are also applicable.

Then at procedure 636, the image capture and process module 581 computes point distribution of the cloud points on the surface found by plane fitting. In certain embodiments, the point distribution reflects whether the points are sufficient close to the surface, e.g., the point distribution may be defined as the sum of distances of all of points to the surface. However, embodiments of the present invention are not limited to this, instead, other definitions to the point distribution are also applicable as long as they can achieve the above objective. When the surface is even, almost all the 3D cloud points of the surface would have a very low variance, that is, the point distribution has a small value. Otherwise, when the surface is uneven, the 3D cloud points have large variance, that is, the point distribution has a large value.

Accordingly, at procedure 638, a predetermined threshold is used as a standard value for comparison. When the point distribution is greater than the threshold, at procedure 639, the image capture and process module 581 sets the surface as an uneven surface; when the point distribution equals to or is less than the threshold, at procedure 640, the image capture and process module 581 sets the surface as an even surface.

In certain aspects, the present invention relates to a non-transitory computer readable medium storing computer executable code. In certain embodiments, the computer executable code may be the robot controlling application 580 stored in the storage device 576 as described above. The computer executable code, when being executed, may perform one of the methods described above. In certain embodiments, the non-transitory computer readable medium may include, but not limited to, the storage device 576 of the controller 570 as described above, or any other storage media of the controller 570.

Certain embodiments of the present invention, among other things, have the following beneficial advantages: (1) the mobile robotic device has an operational portion. The operational portion, such as at least two arms, can function both as robotic arms to operate an object and as robotic legs to move the mobile robotic device on uneven surfaces or stairs such as by walking. The bi-function of the operational portion enables the mobile robotic device to work under variety of environment situations. (2) By determining whether the surface is even or uneven, the mobile robotic device is configured to switch between the manipulation mode and locomotion mode. Therefore, the mobile robotic device is suitable for automatic applications under complicated situations.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A mobile robotic device, comprising:
a body;
a rotatable portion connected to the body and configured to support the body in a rotatable manner;
an operational portion, connected to the body and comprising at least two arms;
a controller comprising a processor and a storage device storing computer executable code; and
a visual sensor configured to capture at least one image of a surface on which the mobile robotic device is located,
wherein the mobile robotic device is switchable between a manipulation mode and a locomotion mode, and the at least two arms are configured to manipulate an object in the manipulation mode and configured to support the body and move the mobile robotic device in the locomotion mode; and
wherein the controller is configured to execute the computer executable code at the processor to perform: controlling the visual sensor to capture the at least one image; determining whether the surface is even or uneven depending on the at least one image; and switching or maintaining the mobile robotic device in the manipulation mode by controlling a posture of the body to cause the rotatable portion to support the body on the surface when the surface is even, or switching or maintaining the mobile robotic device in the locomotion mode by controlling the posture of the body to cause the at least two arms to support the body on the surface when the surface is uneven.

2. The mobile robotic device of claim 1, wherein in the manipulation mode, the rotatable portion supports the body in a rotatable manner.

3. The mobile robotic device of claim 2, wherein the rotatable portion comprises one or more wheels rotatably connected to the body.

4. The mobile robotic device of claim 1, wherein in the manipulation mode, the rotatable portion supports the body on a surface and the at least two arms are in non-contact with the surface.

5. The mobile robotic device of claim 1, wherein in the locomotion mode, the at least two arms support the body on a surface and the rotatable portion is in non-contact with the surface.

6. The mobile robotic device of claim 5, wherein in the locomotion mode, the rotatable portion faces away from the surface.

7. The mobile robotic device of claim 1, wherein each of the at least two arms comprises at least two sections jointed to each other.

8. The mobile robotic device of claim 1, wherein a first arm of the at least two arms is connected at a first position on the body both in the manipulation mode and in the locomotion mode, and a second arm of the at least two arms is connected at a second position on the body both in the manipulation mode and in the locomotion mode.

9. The mobile robotic device of claim 1,
wherein the body further comprises a first sliding slot to which a first arm of the at least two arms is slidably jointed, and a second sliding slot to which a second arm of the at least two arms is slidably jointed, and
wherein the first arm is jointed at an upper end of the first sliding slot in the manipulation mode and is jointed at a lower end of the first sliding slot in the locomotion mode, and the second arm is jointed at an upper end of the second sliding slot in the manipulation mode and is jointed at a lower end of the second sliding slot in the locomotion mode.

10. The mobile robotic device of claim 1, wherein the image captured by the visual sensor is in a form of three-dimensional cloud points, and determining whether the surface is even or uneven depending on the image captured by the visual sensor comprises:
finding the surface from the image by using plane fitting; computing point distribution on the surface; and
deciding the surface is uneven when the point distribution is greater than a predetermined threshold, or deciding the surface is even when the point distribution is less than or equal to the predetermined threshold.

11. A method of controlling a mobile robotic device, the method comprising:
- capturing, by a visual sensor of the mobile robotic device, at least one image of a surface on which the motile robotic device is located;
- determining, by a controller of the mobile robotic device, whether the surface is even or uneven depending on the at least one image; and
- switching or maintaining, by the controller, the mobile robotic device in a manipulation mode by controlling a posture of a body of the mobile robotic device to cause a rotatable portion of the robotic device to support the body on the surface when the surface is even, or switching or maintaining, by the controller, the mobile robotic device in a locomotion mode by controlling the posture of the body to cause at least two arms of an operational portion of the mobile robotic device to support the body on the surface when the surface is uneven,
- wherein the rotatable portion and the operational portion are connected to the body, and the rotatable portion is configured to support the body in a rotatable manner.

12. The method of claim 11, wherein the image captured by the visual sensor is in a form of three-dimensional cloud points, and determining whether the surface is even or uneven depending on the image captured by the visual sensor comprises:
- finding the surface from the image by using plane fitting;
- computing point distribution on the surface; and
- deciding the surface is uneven when the point distribution is greater than a predetermined threshold, or deciding the surface is even when the point distribution is less than or equal to the predetermined threshold.

13. A mobile robotic device, comprising:
- a body; and
- at least two arms connected to the body,
- wherein the body comprises a first sliding slot to which a first arm of the at least two arms is slidably jointed, and a second sliding slot to which a second arm of the at least two arms is slidably jointed; and
- wherein the mobile robotic device is switchable between a manipulation mode in which the at least two arms are configured to manipulate an object and a locomotion mode in which the at least two arms support the body and move the mobile robotic device.

14. The mobile robotic device of claim 13, wherein the mobile robotic device maintains or switches to the manipulation mode when a surface the mobile robotic device is located on is even, and the mobile robotic device maintains or switches to the locomotion mode when the surface is uneven.

15. The mobile robotic device of claim 13, wherein each of the at least two arms comprises at least two sections jointed to each other.

16. The mobile robotic device of claim 13, wherein the first arm is located at an upper end of the first sliding slot in the manipulation mode and is located at a lower end of the first sliding slot in the locomotion mode; and wherein the second arm is located at an upper end of the second sliding slot in the manipulation mode and is located at a lower end of the second sliding slot in the locomotion mode.

* * * * *